(12) United States Patent
Hosono

(10) Patent No.: US 8,463,318 B2
(45) Date of Patent: Jun. 11, 2013

(54) MOBILE COMMUNICATION METHOD, RADIO CONTROLLER, NETWORK DEVICE, RADIO BASE STATION AND CONCENTRATOR

(75) Inventor: Hiroyuki Hosono, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 159 days.

(21) Appl. No.: 12/996,240

(22) PCT Filed: Jun. 4, 2009

(86) PCT No.: PCT/JP2009/060265
§ 371 (c)(1),
(2), (4) Date: Feb. 18, 2011

(87) PCT Pub. No.: WO2009/148125
PCT Pub. Date: Dec. 10, 2009

(65) Prior Publication Data
US 2011/0159838 A1  Jun. 30, 2011

(30) Foreign Application Priority Data
Jun. 4, 2008 (JP) ................. 2008-147465

(51) Int. Cl.
*H04M 1/00* (2006.01)
(52) U.S. Cl.
USPC ......... 455/550.1; 455/561; 455/436; 370/328
(58) Field of Classification Search
USPC .................. 455/550.1, 561, 436; 370/328
See application file for complete search history.

(56) References Cited

U.S. PATENT DOCUMENTS

2007/0167175 A1* 7/2007 Wong et al. ............... 455/456.5
2010/0014495 A1* 1/2010 Hirano ....................... 370/338

FOREIGN PATENT DOCUMENTS

| JP | 2007 134841 | 5/2007 |
| JP | 2007 336461 | 12/2007 |
| JP | 2008 78881 | 4/2008 |
| WO | 2008 20536 | 2/2008 |

OTHER PUBLICATIONS

3GPP TSG RAN #35 RP-070209, "Requirements for LTE Home eNodeBs," Orange. Telecom Italia, T-Mobile, Vodafone, total 4 pages, (Mar. 6-9, 2007).
International Search Report issued Jun. 30, 2009 in PCT/JP09/060265 filed Jun. 4, 2009.
Japanese Office Action issued Aug. 28, 2012, in Japan Patent Application No. 2010-515916 (with English translation).

* cited by examiner

*Primary Examiner* — Danh Le
(74) *Attorney, Agent, or Firm* — Oblon, Spivak, McClelland, Maier & Neustadt, L.L.P.

(57) ABSTRACT

A mobile communication method according to the present invention includes step A of transmitting, by a mobile station 300, a communication start request which requests start of specific communication, to a mobile communication network, step B of determining, by the mobile communication network, a communication type associated with the received communication start request, step C of selecting, by the mobile communication network, a connection target radio base station to which the mobile station 300 is connected at the time of performing the specific communication, the selection being made on the basis of the determined communication type and a location of the mobile station, and a step D of starting, by the mobile station 300, the specific communication through the selected connection target radio base station.

14 Claims, 11 Drawing Sheets

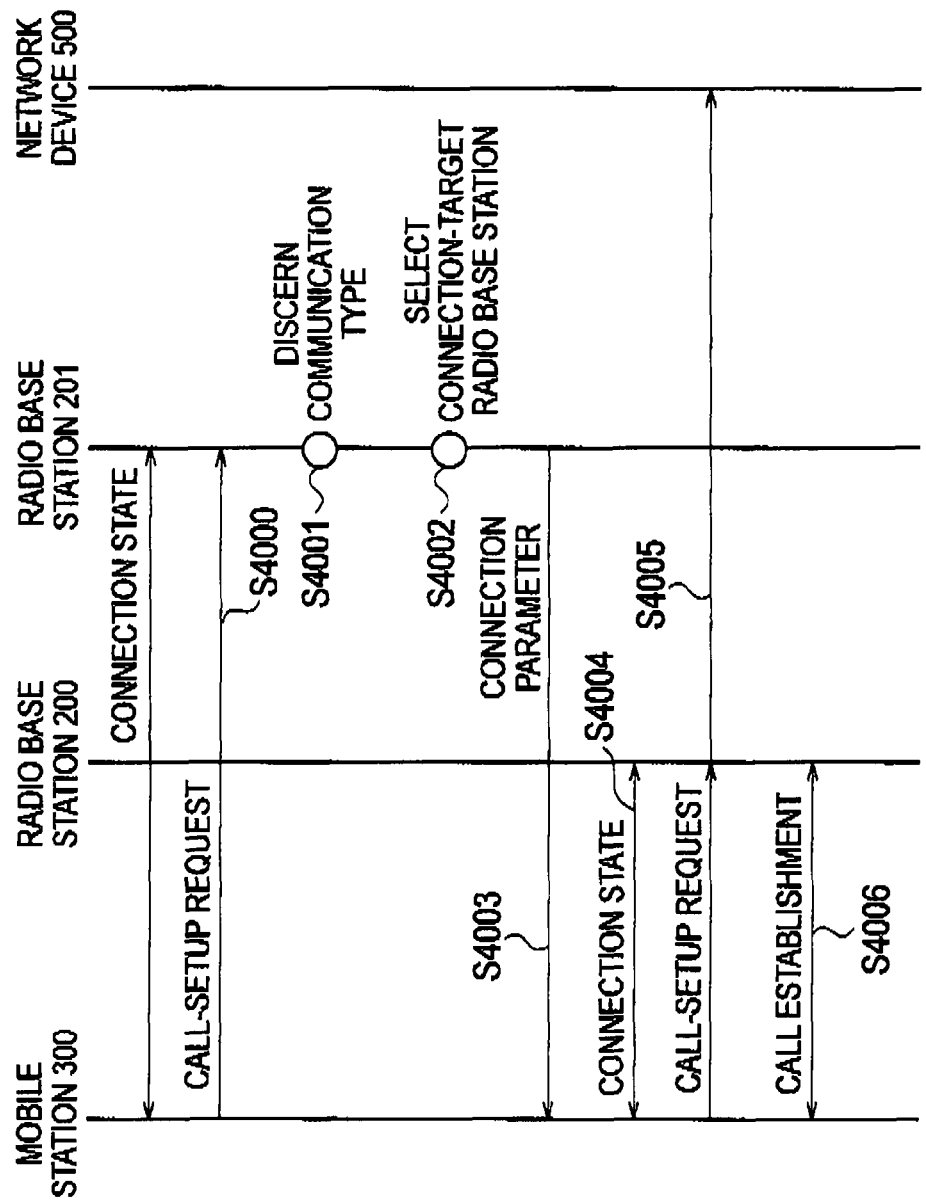

MOBILE COMMUNICATION METHOD, RADIO CONTROLLER, NETWORK DEVICE, RADIO BASE STATION AND CONCENTRATOR

TECHNICAL FIELD

The present invention relates to a mobile communication method, a radio controller, a network device, a radio base station and a concentrator.

BACKGROUND ART

Generally, in order to satisfy service quality requirements from a mobile station, a radio base station for public communications is operated as follows by a network administrator in a mobile communication system.

(1) A private line is used as a line between radio base stations for public communications and a mobile telecommunications operator network, and traffic uncontrollable by the mobile telecommunications operator is not accommodated therein.

(2) Policies on priorities on data pieces flowing in the mobile telecommunications operator network are unified into one, and each of the data pieces is assigned a corresponding one of the priorities according to a service quality requirement by a user.

Note that such a radio base station, installed in a small-scale area such as a home, that is referred to as a "home radio base station (Home eNB), is assumed to be operated by being connected to a general access line, such as FTTH or ADSL, to which the user subscribes.

SUMMARY OF THE INVENTION

Meanwhile, on the communication line between the home radio base station and the mobile telecommunications operator network, traffic uncontrollable by the mobile telecommunications operator (for example, Internet traffic or the like flowing on a user LAN to which the home radio base station is connected) and traffic for the home radio base station might be merged on each other.

For this reason, there has been a problem that, in such a case where the Internet traffic increases, a service quality requirement by the user for specific communication might not be satisfied in the home radio base station.

It is not preferable to perform emergency communication such as Dial 110 or 119 communication through such a home radio base station, because a service quality requirement by a user for the emergency communication might not be satisfied.

Hence, the present invention has been made in view of the aforementioned problem. An object thereof is to provide a mobile communication method, a radio controller, a network device, a radio base station and a concentrator which are capable of satisfying a service quality requirement by a user for specific communication such as emergency communication.

The first feature of the present invention is summarized in that a mobile communication method including step A of transmitting, by a mobile station, a communication start request which requests start of specific communication, to a mobile communication network; step B of determining, by the mobile communication network, a communication type associated with the received communication start request; step C of selecting, by the mobile communication network, a connection target radio base station to which the mobile station is connected at the time of performing the specific communication, the selection being made on the basis of the determined communication type and a location of the mobile station; and step D of starting, by the mobile station, the specific communication through the selected connection target radio base station.

In the first feature of the present invention, in the step B, the mobile communication network may determine the communication type associated with the communication start request, on the basis of destination information included in the communication start request.

In the first feature of the present invention, the mobile communication method may further include a step of acquiring a location of the mobile station by the mobile communication network on the basis of at least one of a location-registered area of the mobile station, identification information of a cell in which the mobile station is currently performing communication and location information indicating a longitude, a latitude and an altitude at which the mobile station is located.

In the first feature of the present invention, in the step C, when the specific communication is an emergency communication, the mobile communication network may select, as a connection target radio base station to which the mobile station is connected at the time of performing the specific communication, a radio base station determined to be highly reliable on the basis of at least one of installation location information, radio quality state in an area under control of the radio base station, a quality state of a backhaul line and whether or not to be a radio base station for public communications.

In the first feature of the present invention, when the mobile station currently performing an emergency communication as the specific communication transmits a handover request to a specific radio base station and when the specific radio base station may not be determined to be highly reliable, the mobile communication network does not receive the handover request.

In the first feature of the present invention, in the step B, a network device in the mobile communication network may determine the communication type associated with the communication start request, and in the step C, a radio controller in the mobile communication network may select a connection target radio base station to which the mobile station is connected at the time of performing the specific communication.

In the first feature of the present invention, in the step B, a network device in the mobile communication network may determine the communication type associated with the communication start request, and in the step C, the network device may select a connection target radio base station to which the mobile station is connected at the time of performing the specific communication.

The second feature of the present invention is summarized in that a radio controller including a connection-target radio-base-station selection unit configured to select a connection target radio base station to which a mobile station is connected at the time of performing the specific communication, the selection being made on the basis of a communication type and a location of the mobile station, the communication type being associated with a communication start request which requests start of the specific communication and is transmitted by the mobile station, and a connection-parameter notification unit configured to notify the mobile station of a connection parameter for starting communication through the connection target radio base station selected by the connection-target radio-base-station selection unit.

In the second feature of the present invention, the connection-target radio-base-station selection unit may know a location of the mobile station on the basis of at least one of a location-registered area of the mobile station, identification information of a cell in which the mobile station is currently performing communication and location information indicating a longitude, a latitude and an altitude at which the mobile station is located.

In the second feature of the present invention, when the specific communication is emergency communication, the connection-target radio-base-station selection unit may select, as a connection target radio base station to which the mobile station is connected at the time of performing the specific communication, a radio base station determined to be highly reliable on the basis of at least one of installation location information, radio quality state in an area under control of the radio base station, a quality state of a backhaul line and whether or not to be a radio base station for public communications.

In the second feature of the present invention, the radio controller may not receive a handover request when the mobile station currently performing emergency communication as the specific communication transmits the handover request to a specific radio base station and when the specific radio base station is not determined to be highly reliable.

The third feature of the present invention is summarized in that a network device including a communication-type determination unit configured to determine the communication type associated with a communication start request which requests start of the specific communication and is transmitted by a mobile station, a connection-target radio-base-station selection unit configured to select a connection target radio base station to which the mobile station is connected at the time of performing the specific communication, the selection being made on the basis of a location of the mobile station and the communication type associated with the communication start request, a connection-parameter notification unit configured to notify the mobile station of a connection parameter for starting communication through the connection target radio base station selected by the connection-target radio-base-station selection unit.

In the third feature of the present invention, the connection-target radio-base-station selection unit may know a location of the mobile station on the basis of at least one of a location-registered area of the mobile station, identification information of a cell in which the mobile station is currently performing communication and location information indicating a longitude, a latitude and an altitude at which the mobile station is located.

In the third feature of the present invention, when the specific communication is emergency communication, the connection-target radio-base-station selection unit may select, as a connection target radio base station to which the mobile station is connected at the time of performing the specific communication, a radio base station determined to be highly reliable on the basis of at least one of installation location information, radio quality state in an area under control of the radio base station, a quality state of a backhaul line and whether or not to be a radio base station for public communications.

In the third feature of the present invention, the network device may not receive a handover request when the mobile station currently performing emergency communication as the specific communication transmits the handover request to a specific radio base station and when the specific radio base station is not determined to be highly reliable.

The fourth feature of the present invention is summarized in that a radio base station including a connection-target radio-base-station selection unit configured to select a connection target radio base station to which a mobile station is connected at the time of performing the specific communication, the selection being made on the basis of a communication type and a location of the mobile station, the communication type being associated with a communication start request which requests start of the specific communication and is transmitted by the mobile station, and a connection-parameter notification unit configured to notify the mobile station of a connection parameter for starting communication through the connection target radio base station selected by the connection-target radio-base-station selection unit.

In the fourth feature of the present invention, the connection-target radio-base-station selection unit may acquire a location of the mobile station by the mobile communication network on the basis of at least one of a location-registered area of the mobile station, identification information of a cell in which the mobile station is currently performing communication and location information indicating a longitude, a latitude and an altitude at which the mobile station is located.

In the fourth feature of the present invention, when the specific communication is emergency communication, the connection-target radio-base-station selection unit may select, as a connection target radio base station to which the mobile station is connected at the time of performing the specific communication, a radio base station determined to be highly reliable on the basis of at least one of installation location information, radio quality state in an area under control of the radio base station, a quality state of a backhaul line and whether or not to be a radio base station for public communications.

The fifth feature of the present invention is summarized in that a concentrator including a connection-target radio-base-station selection unit configured to select a connection target radio base station to which a mobile station is connected at the time of performing the specific communication, the selection being made on the basis of a communication type and a location of the mobile station, the communication type being associated with a communication start request which requests start of the specific communication and is transmitted by the mobile station, and a connection-parameter notification unit configured to notify the mobile station of a connection parameter for starting communication through the radio base station selected by the connection-target radio-base-station selection unit.

As described above, according to the features of the present invention, it is capable to provide a mobile communication method, a radio controller, a network device, a radio base station and a concentrator which are capable of satisfying a service quality requirement by a user for specific communication such as emergency communication.

BRIEF DESCRIPTION OF THE DRAWINGS

FIG. 13 is a sequence diagram showing the operation of the mobile communication system according to a fifth embodiment of the present invention.

BEST MODES FOR CARRYING OUT THE INVENTION

Configuration of Mobile Communication System According to First Embodiment of the Present Invention A description is given of a configuration of a mobile communication system according to a first embodiment of the present invention by referring to FIG. 1 to FIG. 4. The mobile communication system according to this embodiment is a mobile communication system to which a W-CDMA scheme is applied.

Figure 1:
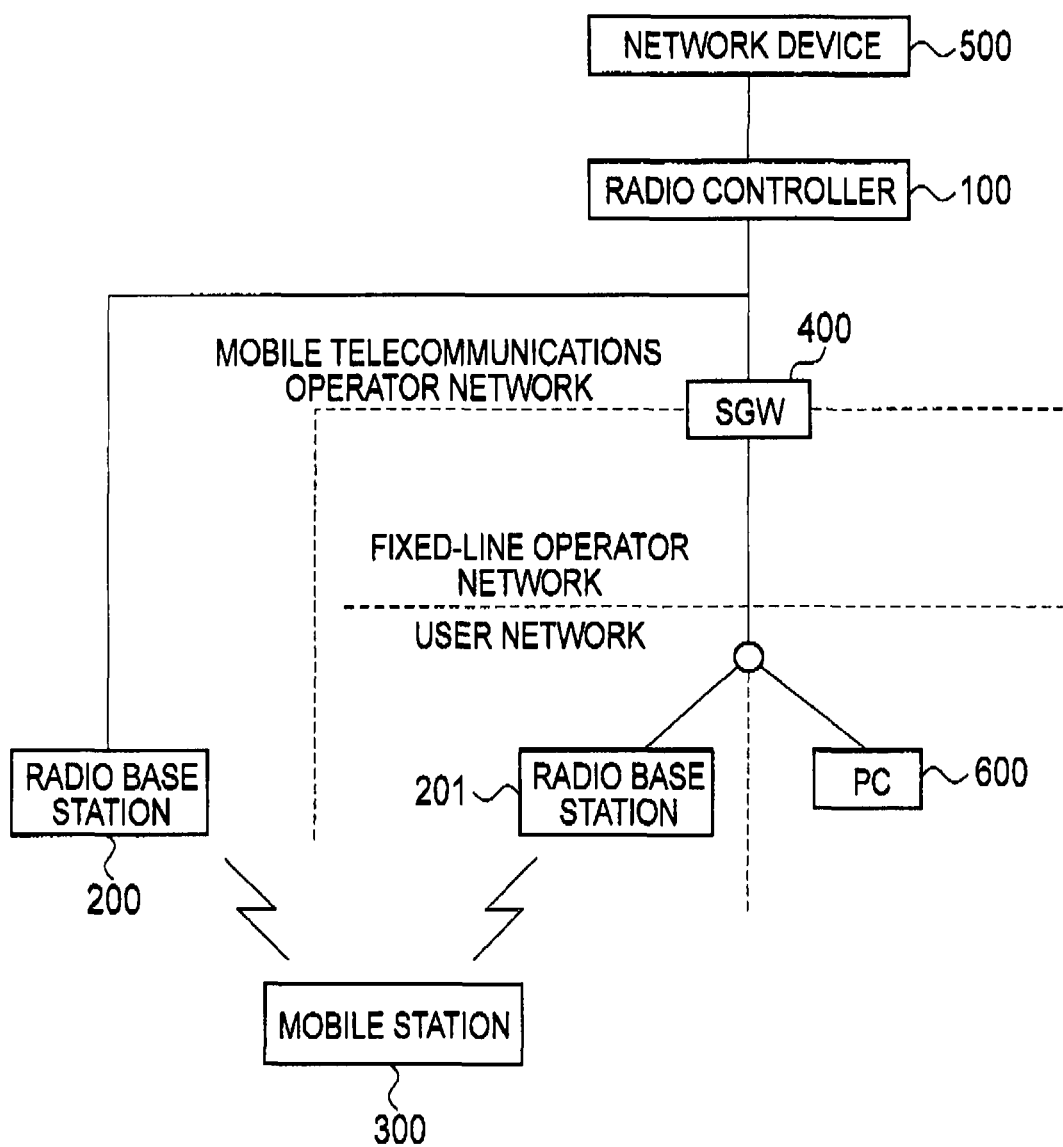
FIG. 1 is an overall configuration diagram of a mobile communication system according to a first embodiment of the present invention.

As shown in FIG. 1, the mobile communication system according to this embodiment includes a network device 500 (for example, an exchange), a radio controller 100, a security device SGW (Security Gateway) 400 and radio base stations 200 and 201.

Note that the radio base stations 200 and 201 are covered by the radio controller 100, and the radio controller 100 is covered by the network device 500.

Specifically, the radio base station 200 is a radio base station for public communication which is installed in a mobile telecommunications operator network managed by a mobile telecommunications operator, while the radio base station 201 is a home radio base station under management of a user who subscribes to a communication service provided by the mobile telecommunications operator.

For example, the radio base station 201 is installed in a user LAN managed by the aforementioned user, and is connected to the radio controller 100 on the mobile telecommunications operator network through a fixed-line operator network formed by access lines or the like, such as FTTH and ADSL.

Note that a service quality requirement from a mobile station 300 might not be satisfied in the radio base station 201 because traffic through the radio base station 201 and Internet traffic from a PC 600 on a user network (user LAN) to which the radio base station 201 is connected are superimposed on each other on a single access line, the Internet traffic being uncontrollable by the mobile telecommunications operator.

Meanwhile, the SGW 400 is installed on a border of the mobile telecommunications operator network. The SGW 400 is a gateway device for protecting the mobile telecommunications operator network from an unauthorized access from another network. The SGW 400 is configured to allow only a certain access to be made to the mobile telecommunications operator network, the certain access being authorized as a proper access by using authentication procedures.

Figure 2:
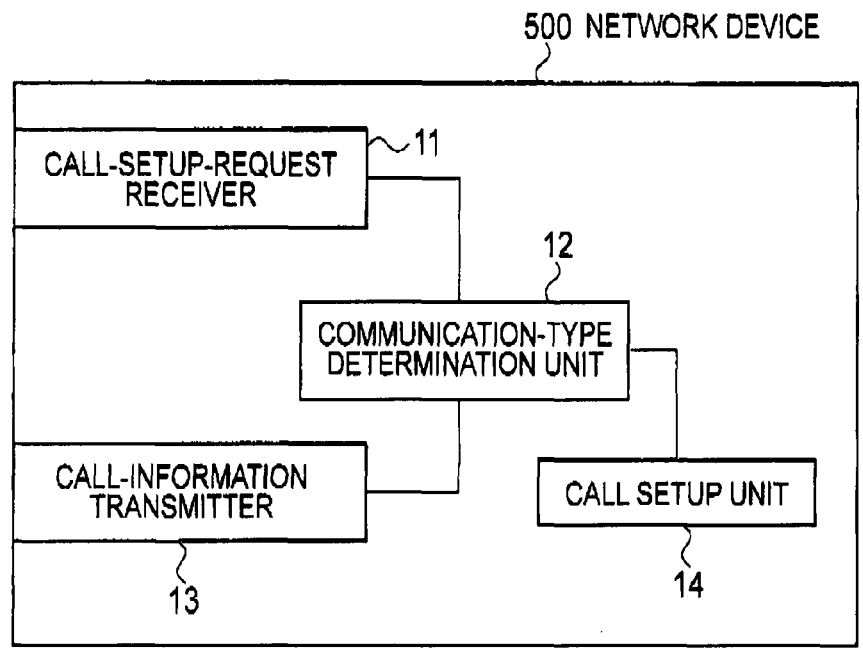
FIG. 2 is a functional block diagram of a network device according to the first embodiment of the present invention.

As shown in FIG. 2, the network device 500 includes a call-setting-request receiver 11, a communication-type determination unit 12, a call-information transmitter 13 and a call setting unit 14.

The call-setting-request receiver 11 is configured to receive a call setting request (communication start request) which requests start of specific communication, the call setting request being transmitted by the mobile station 300.

The communication-type determination unit 12 is configured to determine a communication type associated with the call setting request (communication start request) received by the call-setting-request receiver 11, that is, a type of communication requested by the call setting request (communication start request).

To put it concretely, the communication-type determination unit 12 may be configured to determine the communication type associated with the call setting request (communication start request) on the basis of destination information included in the call setting request (communication start request) received by the call-setting-request receiver 11.

For example, when the destination information included in the call setup request (communication start request) received by the call-setting-request receiver 11 is "Dial 110" or "Dial 119," the communication-type determination unit 12 determines that the communication type associated with the call setting request (communication start request) as "emergency communication or important communication."

The call-information transmitter 13 is configured to transmit, when the communication type associated with the call setting request (communication start request) received by the call-setting-request receiver 11 is "specific communication (for example, emergency communication)," call information indicating to that effect to the radio controller 100.

The call setup unit 14 is configured to perform, when the communication type associated with the call setting request (communication start request) received by the call-setting-request receiver 11 is other than the "specific communication (for example, emergency communication)," call setting processing in response to the call setting request (communication start request).

In addition, the radio controller 100 is configured to allocate, to the radio base stations 200 and 201, operation parameters used in radio communication between the mobile station 300 and the radio base stations 200 and 201, and to manage the operation parameters.

Figure 3:
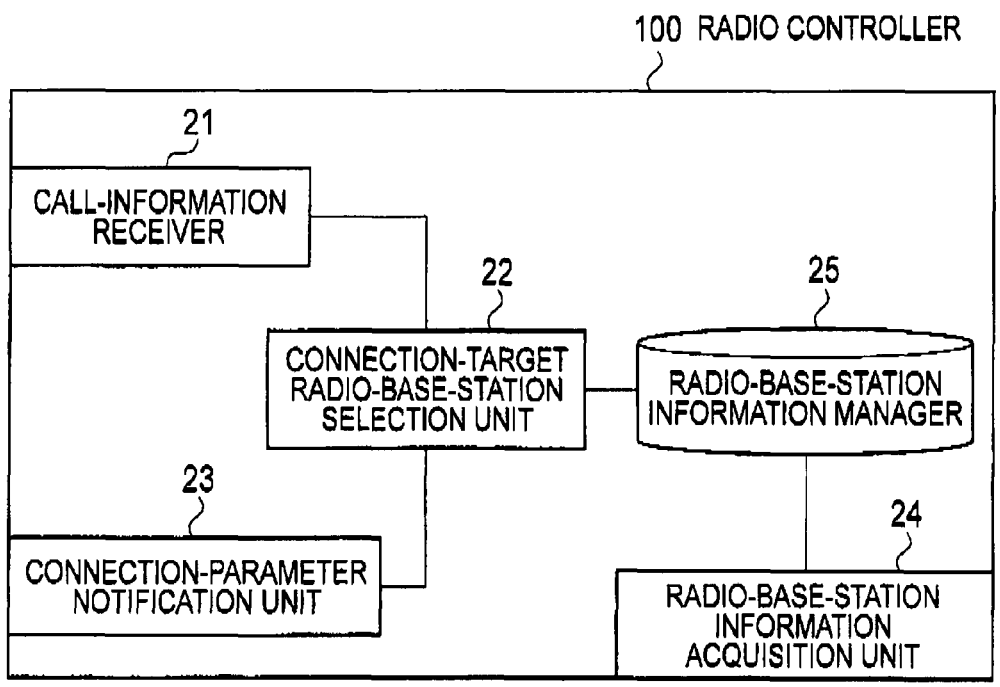
FIG. 3 is a functional block diagram of a radio controller according to the first embodiment of the present invention.

To put it concretely, as shown in FIG. 3, the radio controller 100 includes a call-information receiver 21, a connection-target radio-base-station selection unit 22, a connection-parameter notification unit 23, a radio-base-station information acquisition unit 24 and a radio-base-station information manager 25.

The call-information receiver 21 is configured to receive the aforementioned call information from the network device 500.

The radio-base-station information acquisition unit 24 is configured to acquire communication quality information notified of by any of home radio base stations (for example, the radio base station 201) connected to the user network.

Note that the communication quality information indicates whether or not communication quality can be assured in the radio base station 201.

The radio-base-station information manager 25 is configured to manage the information on the communication qualities of the home radio base stations (for example, radio base station 201) which is acquired by the radio-base-station information acquisition unit 24.

The connection-target radio-base-station selection unit 22 is configured to select a radio base station to which the mobile station 300 is connected at the time of performing "specific communication (for example, emergency communication)," the selection being made on the basis of the "communication type" notified by using the call information received by the call-information receiver 21 and a "location of the mobile station 300".

Note that the connection-target radio-base-station selection unit 22 may be configured to acquire the location of the mobile station 300 on the basis of at least one of a location-registered area of the mobile station 300, identification information of a cell in which the mobile station 300 is currently performing communication and location information (for example, GPS location information) indicating a longitude, a latitude and an altitude at which the mobile station 300 is located.

The connection-target radio-base-station selection unit 22 may be configured to select, when the aforementioned "specific communication" is "emergency communication," a radio base station determined to be highly reliable, as a radio base station to which the mobile station 300 is connected at the time of performing "specific communication," the selection being made on the basis of at least one of installation location information, a radio quality state in each of areas under control, a quality state of a backhaul line (an access line) and whether or not to be a radio base station for public communications.

In addition, the connection-target radio-base-station selection unit 22 may be configured to select a radio base station to which the mobile station 300 is connected at the time of performing "specific communication (for example, emergency communication)" on the basis of information on the communication qualities of home radio base stations, the information managed by the radio-base-station information manager 25.

The connection-parameter notification unit 23 is configured to notify the mobile station 300 of connection parameters for starting communication (for example, a spreading code, frequency information, timing and the like) through the radio base station selected by the connection-target radio-base-station selection unit 22.

Meanwhile, the radio controller 100 is configured not to receive a handover request when the handover request is transmitted to a specific radio base station by the mobile station 300 currently performing the "emergency communication" as the "specific communication" and when the specific radio base station is not determined to be highly reliable.

Figure 4:
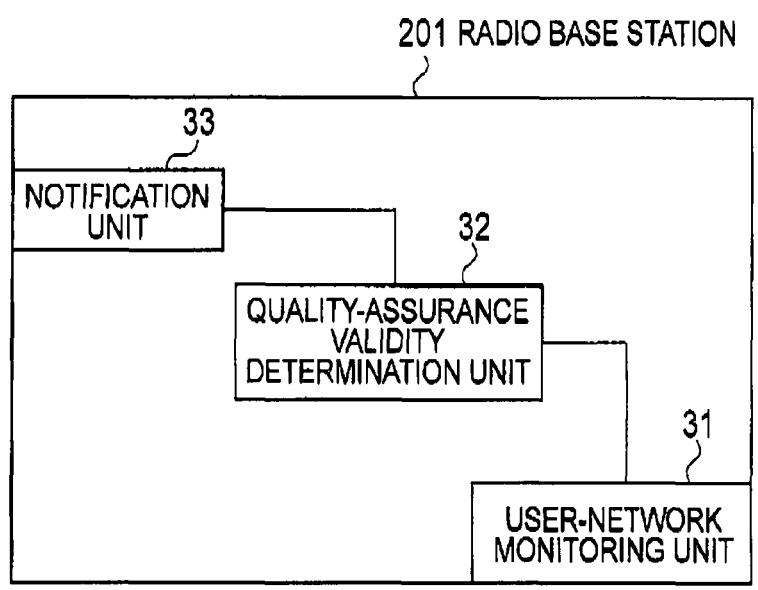
FIG. 4 is a functional block diagram of a radio base station according to the first embodiment of the present invention.

As shown in FIG. 4, the radio base station 201 includes a user-network monitoring unit 31, a quality-assurance validity determination unit 32 and a notification unit 33.

The user-network monitoring unit 31 is configured to monitor certain traffic in the user network.

To put it concretely, the user-network monitoring unit 31 may be configured to monitor the Internet traffic in the user network as the certain traffic.

For example, the user-network monitoring unit 31 is configured to determine, as the Internet traffic, traffic other than traffic addressed to the radio base station 201, traffic addressed to the mobile station 300 and traffic addressed to the mobile telecommunications operator network, in the user network.

The quality-assurance validity determination unit 32 is configured to determine whether or not the communication quality can be assured in the radio base station 201.

For example, when detecting that the aforementioned certain traffic exceeds a predetermined threshold, the quality-assurance validity determination unit 32 may determine that the communication quality cannot be assured.

The notification unit 33 is configured to generate communication quality information on the basis of a result of a determination by the quality-assurance validity determination unit 32 and then to notify the radio controller 100 of the communication quality information.

Note that the notification unit 33 may be configured to generate communication quality information and then to notify the radio controller 100 of the communication quality information, only when the quality-assurance validity determination unit 32 determines that the communication quality cannot be assured in the radio base station 201.

(Operation of Mobile Communication System According to First Embodiment of the Present Invention)

Figure 5:
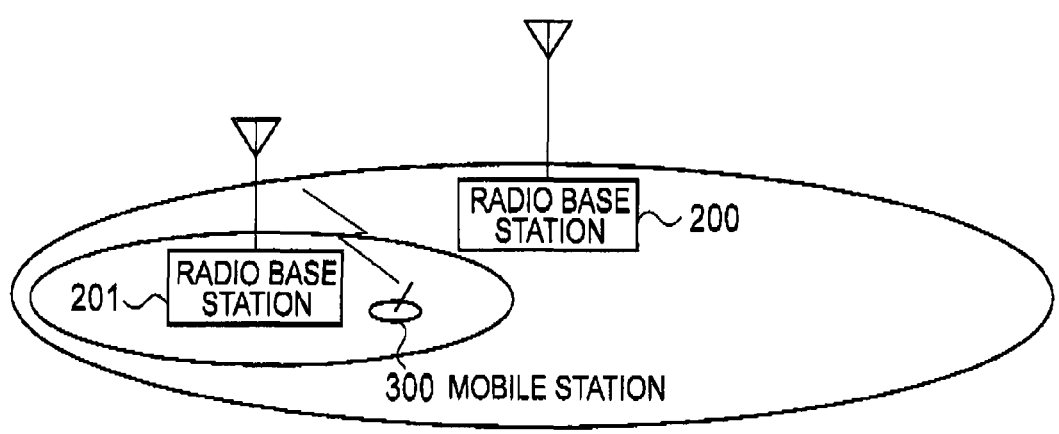
FIG. 5 is a diagram for explaining the mobile communication system according to the first embodiment of the present invention.
Figure 6:
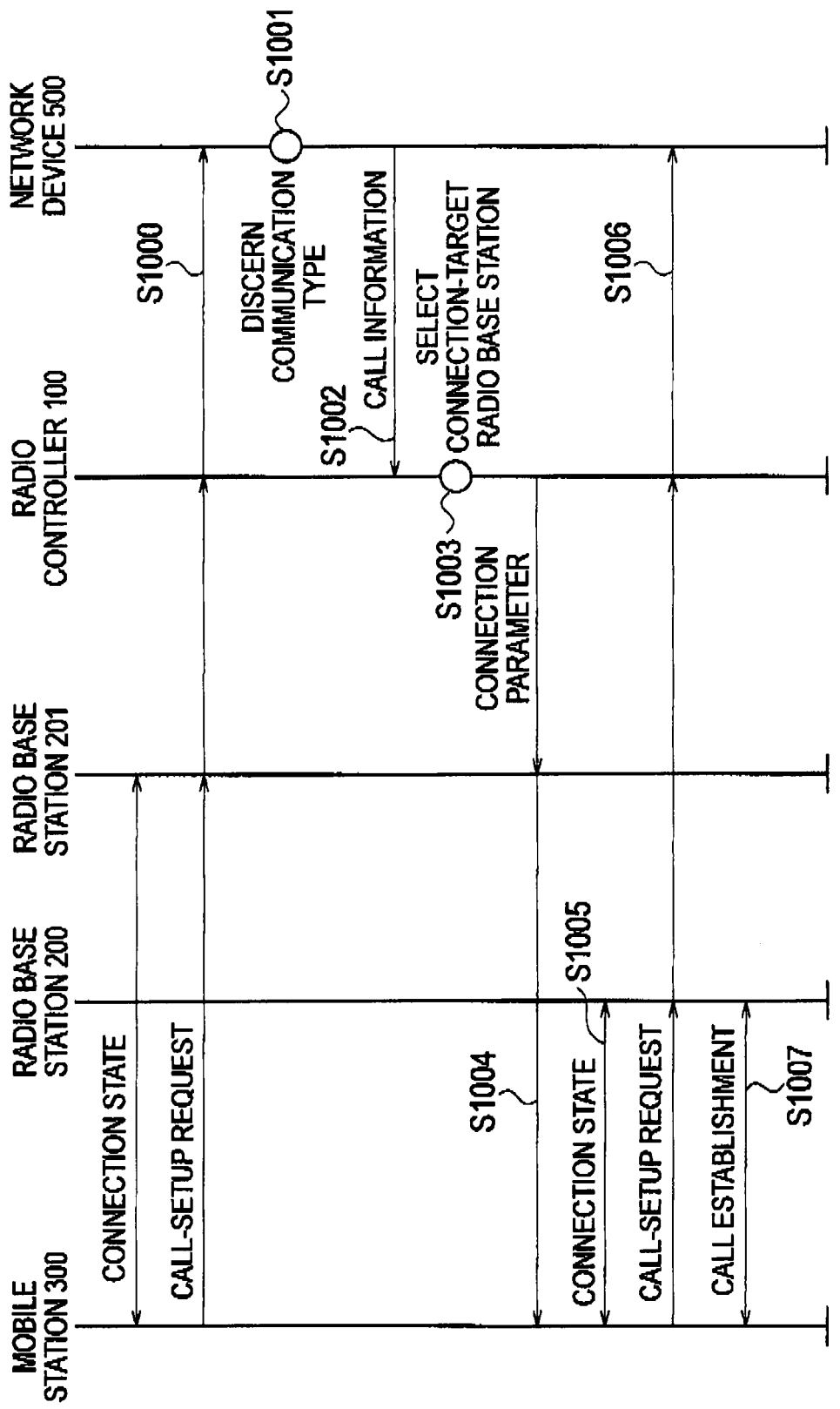
FIG. 6 is a sequence diagram showing the operation of the mobile communication system according to the first embodiment of the present invention.

A description is given of an operation of the mobile communication system according to the first embodiment of the present invention by referring to FIG. 5 and FIG. 6.

Note that, as shown in FIG. 5, in this embodiment, the mobile station 300 is assumed to be connected to the radio base station 201, and in addition, an area covered by the radio base station 201 is assumed to overlap with an area covered by the radio base station 200.

In step S1000, the mobile station 300 transmits a call setting request (communication start request) which requests start of the specific communication (for example, emergency communication), to the network device 500 through the radio base station 201 and the radio controller 100.

In step S1001, the network device 500 discerns a type of communication requested by the mobile station 300 to be started, on the basis of the received call setting request (communication start request).

For example, when destination information included in the call setting request (communication start request) is "Dial 110" or "Dial 119," the network device 500 determines that the call setting request requests start of "emergency communication (important communication)."

In step S1002 after the determination, the network device 500 notifies the radio controller 100 of call information indicating the content of the call setting request (communication start request) transmitted by the mobile station 300.

In step S1003, the radio controller 100 discerns that the "specific communication" notified by using the received call information is "emergency communication (important communication)" and that the radio base station 201 connected to the mobile station 300 is a home radio base station managed by a user. In addition, as a radio base station to be newly connected to the mobile station 300, the radio controller 100 selects the radio base station 200 which is a radio base station for public communications under control of the mobile telecommunications operator network and whose coverage area overlaps with that of the radio base station 201.

Here, the radio controller 100 may select a home radio base station in a state where the communication quality therein can be assured, as the radio base station to be newly connected to the mobile station 300.

In step S1004, the radio controller 100 notifies the mobile station 300 of connection parameters, such as a frequency, which are used by the selected radio base station 200.

In step S1005, the mobile station 300 performs connection to the radio base station 200 by using the received connection parameters. Thereafter, in step S1006, the mobile station 300 again notifies the network device 500 of a call setting request (communication start request) through the radio base station 200 and the radio controller 100.

In step S1007, the mobile station 300 establishes a call associated with the call setting request between itself and the radio base station 200, that is, starts communication associated with the call setting request.

(Advantageous Effects of Mobile Communication System According to First Embodiment of Present Invention)

The mobile communication system according to the first embodiment of the present invention makes it possible to perform emergency communication (important communication) by using a radio base station for public communications whose communication quality can be assured, and to perform general communication by using a home radio base station whose communication quality might not be assured, thus satisfying a service quality requirement from the mobile station 300.

(Configuration of Mobile Communication System According to Second Embodiment of the Present Invention)

Figure 7:
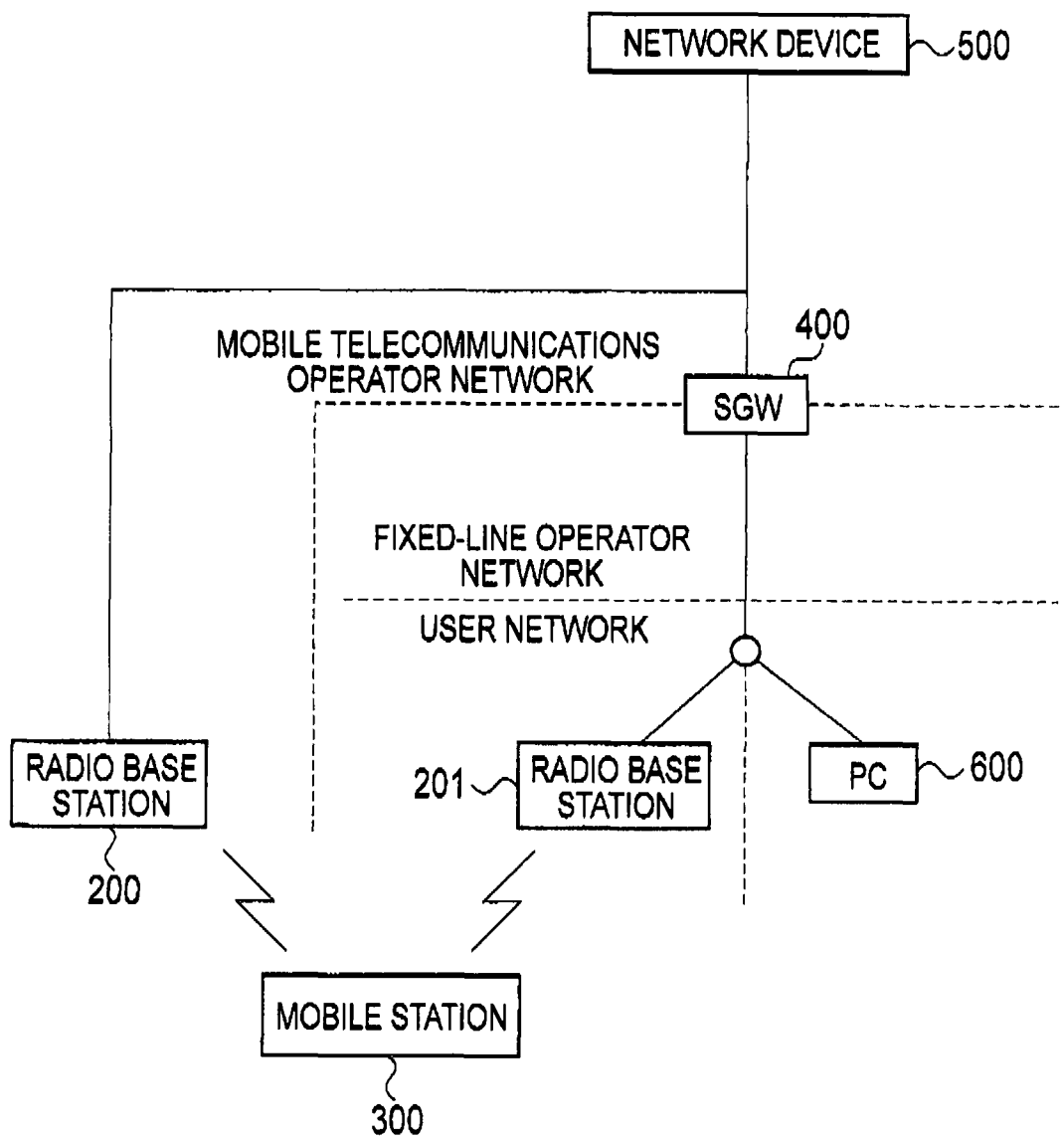
FIG. 7 is an overall configuration diagram of a mobile communication system according to a second embodiment of the present invention.
Figure 8:
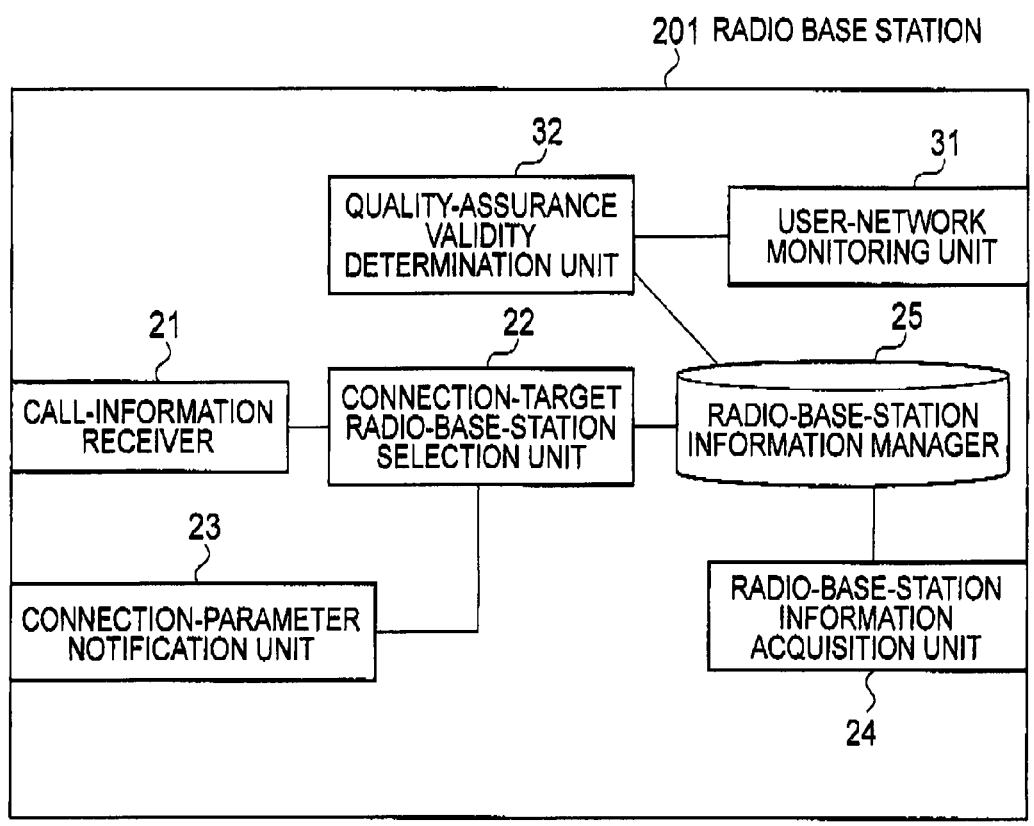
FIG. 8 is a functional block diagram of a radio base station according to the second embodiment of the present invention.
Figure 9:
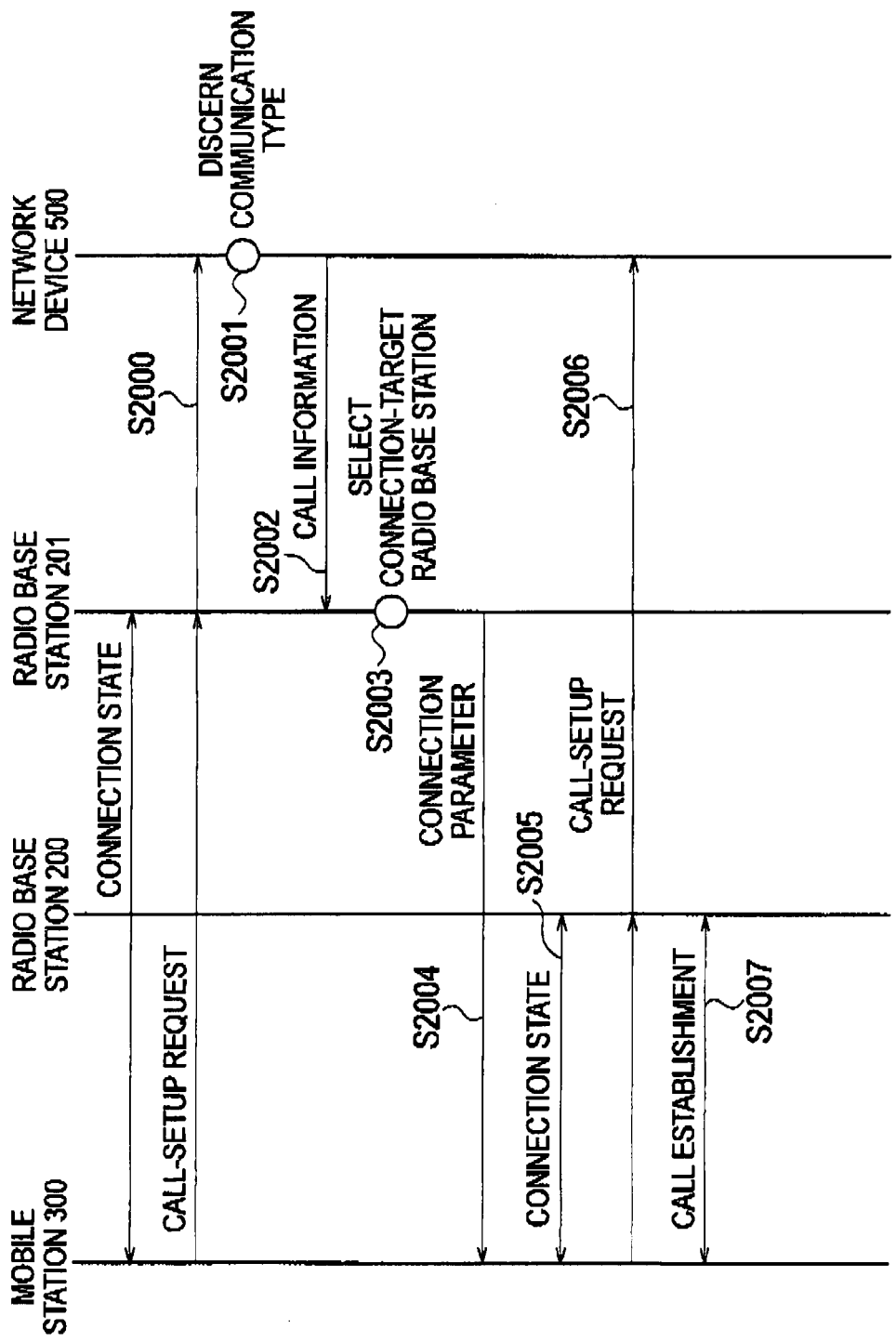
FIG. 9 is a sequence diagram showing the operation of the mobile communication system according to the second embodiment of the present invention.

A description is given of a configuration of a mobile communication system according to a second embodiment of the present invention by referring to FIG. 7 through FIG. 9, being focused on a difference from the mobile communication system according to the aforementioned first embodiment.

The description has been given in the aforementioned first embodiment by taking the W-CDMA mobile communication system as an example. However, the present invention is not limited to such a mobile communication system, and is applicable to, for example, an LTE (Long Term Evolution) mobile communication system.

Hence, the mobile communication system according to the second embodiment of the present invention is assumed to be a mobile communication system to which an LTE scheme is applied.

In this case, functions of the aforementioned radio controller 100 are implemented on a radio base station eNB. Thus, as shown in FIG. 7, radio base stations 200 and 201 are connected to a network device 500, so that a radio access network is formed.

As shown in FIG. 8, the radio base station 201 includes a call-information receiver 21, a connection-target radio-base-station selection unit 22, a connection-parameter notification unit 23, a radio-base-station information acquisition unit 24, a radio-base-station information manager 25, a user-network monitoring unit 31 and a quality-assurance validity determination unit 32.

The call-information receiver 21 is configured to receive the aforementioned call information from the network device 500, like the call-information receiver 21 shown in FIG. 3.

The radio-base-station information acquisition unit 24 is configured to exchange control information with different home radio base stations and radio base stations for public communications and then to acquire radio base station information (for example, a coverage area and the like) on a corresponding one of the home radio base stations and the radio base stations for public communications. Specifically, the radio base station information includes the aforementioned communication quality information.

The radio-base-station information manager 25 is configured to manage the radio base station information on the home radio base stations and the radio base stations for public communications, the radio base station information being acquired by the radio-base-station information acquisition unit 24.

Like the connection-target radio-base-station selection unit 22 shown in FIG. 3, the connection-target radio-base-station selection unit 22 is configured to select a radio base station to which the mobile station 300 is connected at the time of performing "specific communication (for example, emergency communication)," the selection being made on the basis of the "communication type" notified by using the call information received by the call-information receiver 21 and a "location of the mobile station 300."

Also, like the connection-target radio-base-station selection unit 22 shown in FIG. 3, the connection-target radio-base-station selection unit 22 may be configured to select a radio base station to which the mobile station 300 is connected at the time of performing "specific communication (for example, emergency communication)," the selection being made on the basis of the communication quality information in the home radio base stations managed by the radio-base-station information manager 25.

Like the connection-parameter notification unit 23 shown in FIG. 3, the connection-parameter notification unit 23 is configured to notify the mobile station 300 of connection parameters for starting communication (for example, a spreading code, frequency information, timing and the like) through the radio base station selected by the connection-target radio-base-station selection unit 22.

Note that the user-network monitoring unit 31 and the quality-assurance validity determination unit 32 have the same functions as those of the user-network monitoring unit 31 and the quality-assurance validity determination unit 32 shown in FIG. 4.

A description is given below of an operation of the mobile communication system according to this embodiment by referring to FIG. 9.

Note that, as shown in FIG. 5, in this embodiment as in the aforementioned first embodiment, the mobile station 300 is assumed to be connected to the radio base station 201 and, in addition, an area covered by the radio base station 201 is assumed to overlap with an area covered by the radio base station 200.

In step S2000, the mobile station 300 transmits a call setting request (communication start request) which requests start of the specific communication (for example, emergency communication), to the network device 500 through the radio base station 201.

In step S2001, the network device 500 discerns a type of communication which is requested by the mobile station 300 to be started, on the basis of the received call setting request (communication start request).

For example, when destination information included in the call setting request (communication start request) is "Dial 110" or "Dial 119," the network device 500 determines that the call setting request requests start of "emergency communication (important communication)."

In step S2002 after the determination, the network device 500 notifies the radio base station 201 of call information indicating the content of the call setting request (communication start request) transmitted by the mobile station 300.

In step S2003, radio base station 201 discerns that the "specific communication" notified by using the received call information is "emergency communication (important communication)." In addition, the radio base station 201 selects, as a radio base station to be newly connected to the mobile station 300, the radio base station 200 which is a radio base station for public communications under control of the mobile telecommunications operator network and whose coverage area overlaps with that of the radio base station 201.

Here, the radio base station 201 may select a home radio base station in a state where the communication quality therein can be assured, as the radio base station to be newly connected to the mobile station 300.

In step S2004, the radio base station 201 notifies the mobile station 300 of connection parameters, such as a frequency, which are used by the selected radio base station 200.

In step S2005, the mobile station 300 performs connection to the radio base station 200 by using the received connection parameters. Thereafter, in step S2006, the mobile station 300 again notifies the network device 500 of a call setting request (communication start request) through the radio base station 200.

In step S2007, the mobile station 300 establishes a call associated with the call setting request between itself and the radio base station 200, that is, starts communication associated with the call setting request.

(Configuration of Mobile Communication System According to Third Embodiment of Present Invention)

Figure 10:
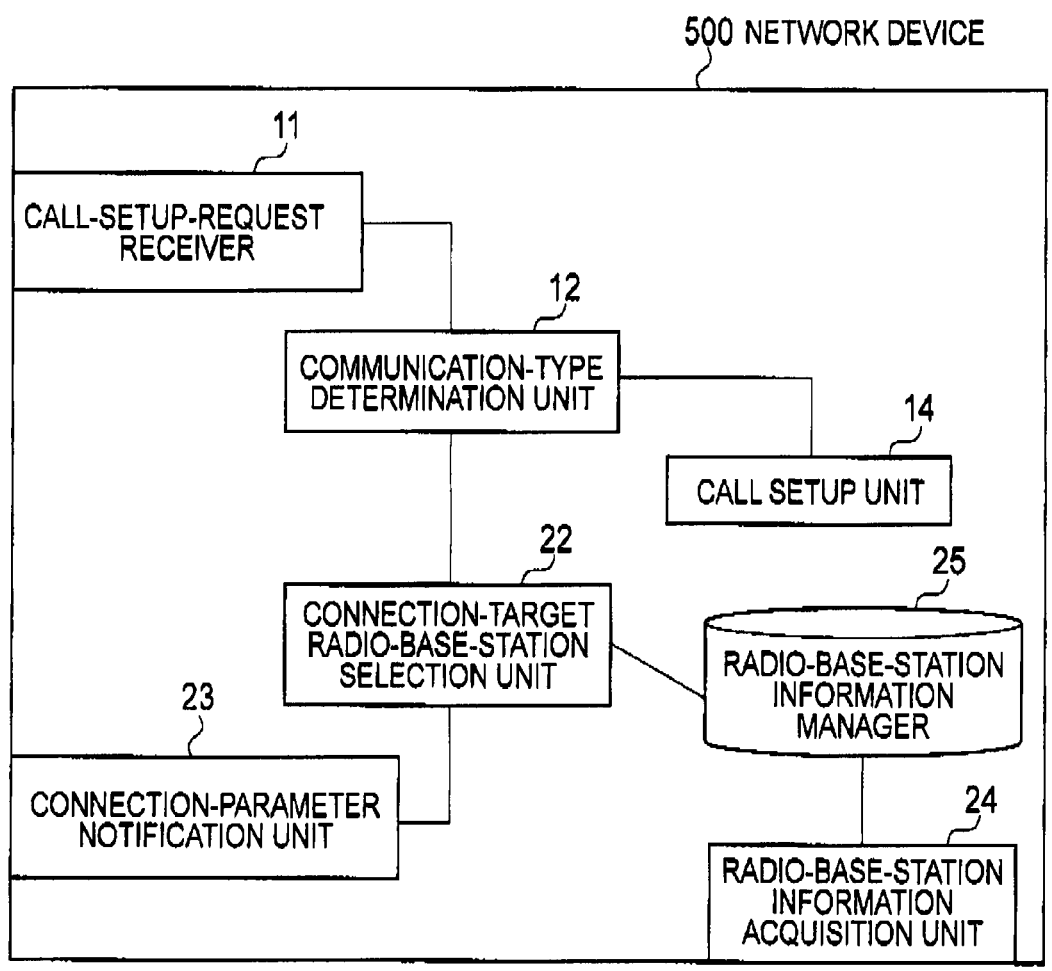
FIG. 10 is a functional block diagram of a network device according to a third embodiment of the present invention.
Figure 11:
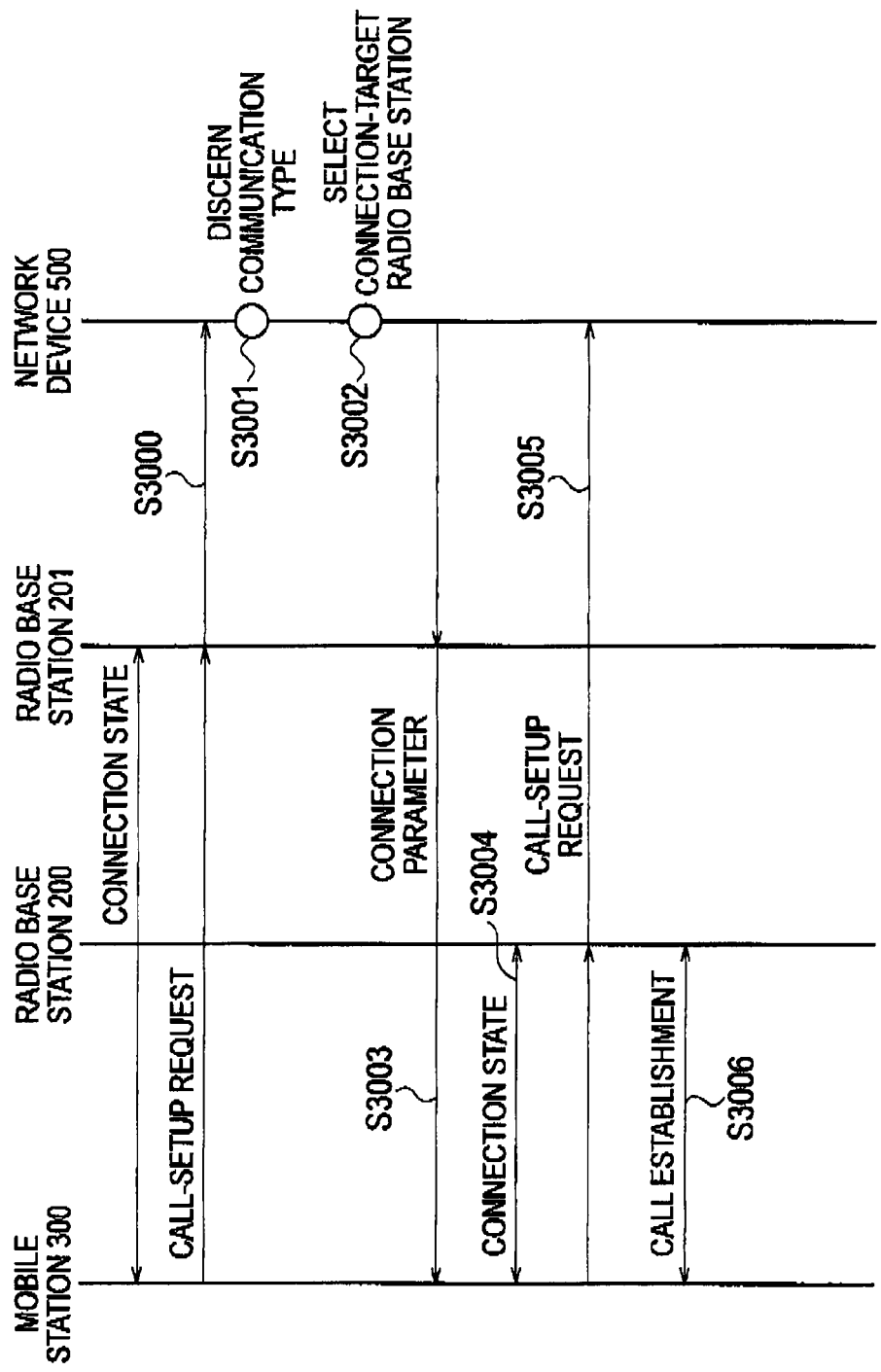
FIG. 11 is a sequence diagram showing the operation of the mobile communication system according to the third embodiment of the present invention.

A description is given of a configuration of a mobile communication system according to a third embodiment of the present invention by referring to FIG. 10 and FIG. 11, being focused on a difference from the mobile communication system according to the aforementioned first embodiment.

Note that the mobile communication system according to the third embodiment of the present invention is assumed to be a mobile communication system to which an LTE scheme is applied.

As shown in FIG. 10, the network device 500 includes a call-setting-request receiver 11, a communication-type determination unit 12, a call setting unit 14, a connection-target radio-base-station selection unit 22, a connection-parameter notification unit 23, a radio-base-station information acquisition unit 24, and a radio-base-station information manager 25.

Note that functions of the units are the same as those of the units which are included in the radio controller 100 and the network device 500 according to the aforementioned first embodiment and which are assigned the same reference numerals and names.

A description is given below of an operation of the mobile communication system according to this embodiment by referring to FIG. 11.

Note that, as shown in FIG. 5, in this embodiment as in the aforementioned first embodiment, the mobile station 300 is assumed to be connected to the radio base station 201 and, in addition, an area covered by the radio base station 201 is assumed to overlap with an area covered by the radio base station 200.

In step S3000, the mobile station 300 transmits a call setting request (communication start request) which requests start of the specific communication (for example, emergency communication), to the network device 500 through the radio base station 201.

In step S3001, the network device 500 discerns a type of communication which is requested by the mobile station 300 to be started, on the basis of the received call setting request (communication start request).

For example, when destination information included in the call setting request (communication start request) is "Dial 110" or "Dial 119," the network device 500 determines that the call setting request requests start of "emergency communication (important communication)."

In step S3002 after the determination, the network device 500 discerns that the aforementioned "specific communication" is "emergency communication (important communication)" and that the radio base station 201 connected to the mobile station 300 is a home radio base station managed by a user. In addition, as a radio base station to be newly connected to the mobile station 300, the network device 500 selects the radio base station 200 which is a radio base station for public communications under control of the mobile telecommunications operator network and whose coverage area overlaps with that of the radio base station 201.

Here, the network device 500 may select a home radio base station in a state where the communication quality therein can be assured, as the radio base station to be newly connected to the mobile station 300.

In step S3003, the network device 500 notifies the mobile station 300 of connection parameters, such as a frequency, which are used by the selected radio base station 200.

In step S3004, the mobile station 300 performs connection to the radio base station 200 by using the received connection parameters. Thereafter, in step S3005, the mobile station 300 again notifies the network device 500 of a call setting request (communication start request) through the radio base station 200.

In step S3006, the mobile station 300 establishes a call associated with the call setting request between itself and the radio base station 200, that is, starts communication associated with the call setting request.

(Configuration of Mobile Communication System According to Fourth Embodiment of Present Invention)

Figure 12:
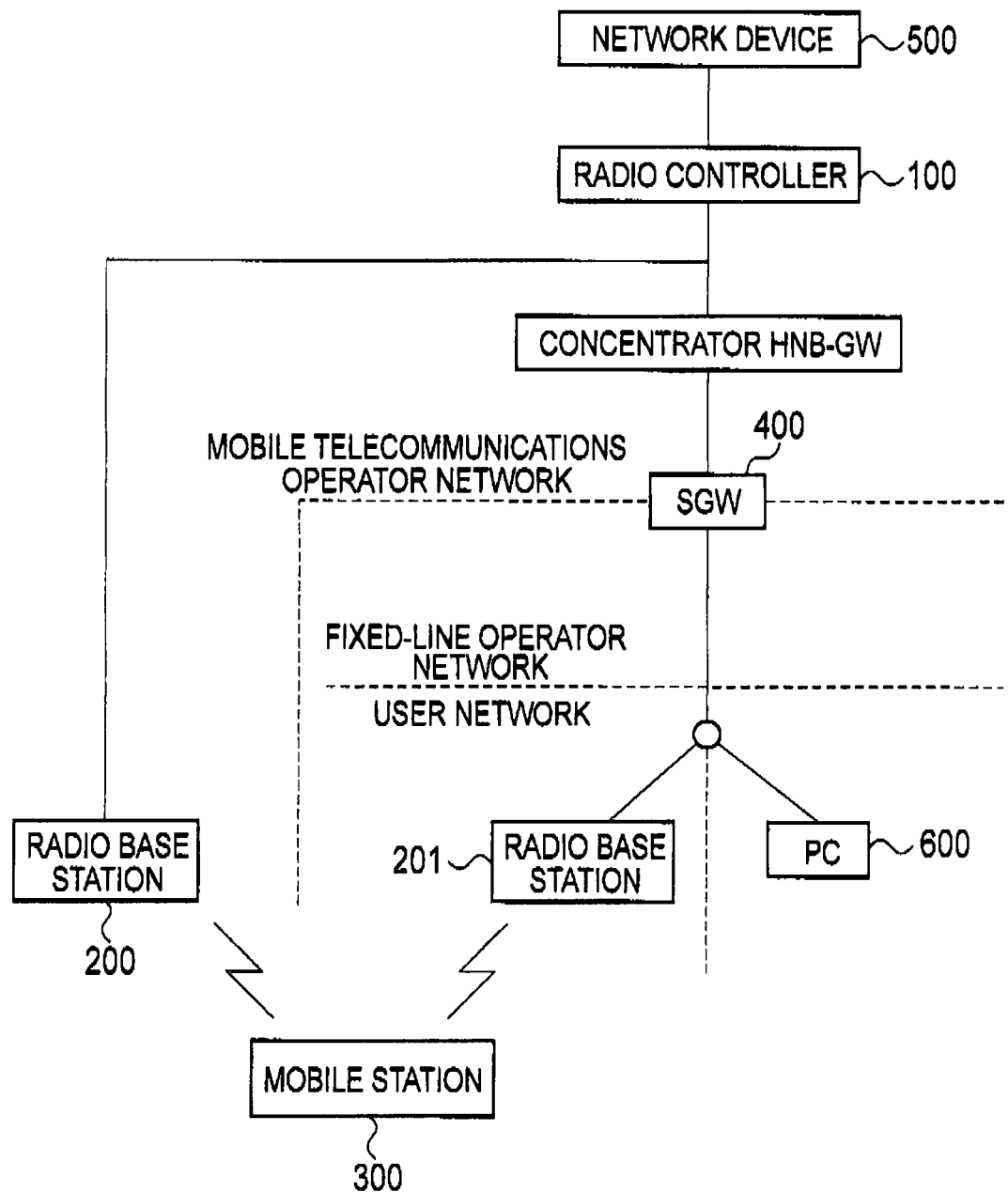
FIG. 12 is an overall configuration diagram of a mobile communication system according to a fourth embodiment of the present invention.

A description is given of a configuration of a mobile communication system according to a fourth embodiment of the present invention by referring to FIG. 12, being focused on a difference from the mobile communication system according to the aforementioned first embodiment.

As shown in FIG. 12, the mobile communication system according to this embodiment is provided with a concentrator HNB-GW. A radio base station 201 is covered by the concentrator HNB-GW.

Specifically, the concentrator HNB-GW is configured to include at least part of the functions (functions shown in FIG. 3) of the radio controller 100 according to the aforementioned first embodiment.

The mobile communication system according to this embodiment may be a W-CDMA mobile communication system or an LTE mobile communication system.

(Configuration of Mobile Communication System According to Fifth Embodiment)

A description is given of a mobile communication system according to a fifth embodiment of the present invention by referring to FIG. 13, being focused on a difference from the mobile communication system according to the aforementioned third embodiment.

A radio base station 201 according to this embodiment is configured to include at least part of the functions (functions shown in FIG. 10) of the network device 500 according to the aforementioned third embodiment.

A description is given below of an operation of the mobile communication system according to this embodiment by referring to FIG. 13.

Note that, as shown in FIG. 5, in this embodiment as in the aforementioned first embodiment, the mobile station 300 is assumed to be connected to the radio base station 201 and, in addition, an area covered by the radio base station 201 is assumed to overlap with an area covered by the radio base station 200.

In step S4000, the mobile station 300 transmits a call setting request (communication start request) which requests start of the specific communication (for example, emergency communication), to the radio base station 201.

In step S4001, the network device 500 discerns a type of communication which is requested by the mobile station 300 to be started, on the basis of the received call setting request (communication start request).

For example, when destination information included in the call setting request (communication start request) is "Dial 110" or "Dial 119," the radio base station 201 determines that the call setting request requests start of "emergency communication (important communication),"

In step S4002 after the determination, the radio base station 201 discerns that the aforementioned "specific communication" is "emergency communication (important communication)" and that the radio base station 201 connected to the mobile station 300 is a home radio base station managed by a user. In addition, as a radio base station to be newly connected to the mobile station 300, the network device 500 selects the radio base station 200 which is a radio base station for public communications under control of the mobile telecommunications operator network and whose coverage area overlaps with that of the radio base station 201.

Here, the radio base station 201 may select a home radio base station in a state where the communication quality therein can be assured, as the radio base station to be newly connected to the mobile station 300.

In step S4003, the radio base station 201 notifies the mobile station 300 of connection parameters, such as a frequency, which are used by the selected radio base station 200.

In step S4004, the mobile station 300 performs connection to the radio base station 200 by using the received connection parameters. Thereafter, in step S4005, the mobile station 300 again notifies the network device 500 of a call setting request (communication start request) through the radio base station 200.

In step S4006, the mobile station 300 establishes a call associated with the call setting request between itself and the radio base station 200, that is, starts communication associated with the call setting request.

Incidentally, the operation of the above-mentioned radio base stations 200, 201, the radio controller 100, the network device 500 and the concentrator HNB-GW may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the radio controller 200, 201, the radio controller 100, the network device 500 and the concentrator HNB-GW. Alternatively, the storage medium and the processor may be provided in the radio controller 200, 201, the radio controller 100, the network device 500 and the concentrator HNB-GW as a discrete component.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
    step A of transmitting, by a mobile station, a communication start request which requests start of specific communication, to a mobile communication network;
    step B of determining, by the mobile communication network, a communication type associated with the received communication start request;
    step C of selecting, by the mobile communication network, a connection target radio base station to which the mobile station is connected at the time of performing the specific communication, the selection being made on the basis of the determined communication type and a location of the mobile station; and
    step D of starting, by the mobile station, the specific communication through the selected connection target radio base station,
    the method further comprising a step of acquiring a location of the mobile station by the mobile communication network on the basis of at least one of a location-registered area of the mobile station, identification information of a cell in which the mobile station is currently performing communication and location information indicating a longitude, a latitude and an altitude at which the mobile station is located.

2. The mobile communication method according to claim 1, wherein in the step B, the mobile communication network determines the communication type associated with the communication start request, on the basis of destination information included in the communication start request.

3. The mobile communication method according to claim 1, wherein
    in the step B, a network device in the mobile communication network determines the communication type associated with the communication start request, and
    in the step C, a radio controller in the mobile communication network selects a connection target radio base station to which the mobile station is connected at the time of performing the specific communication.

4. The mobile communication method according to claim 1, wherein
    in the step B, a network device in the mobile communication network determines the communication type associated with the communication start request, and
    in the step C, the network device selects a connection target radio base station to which the mobile station is connected at the time of performing the specific communication.

5. A mobile communication method comprising:
    step A of transmitting, by a mobile station, a communication start request which requests start of specific communication, to a mobile communication network;
    step B of determining, by the mobile communication network, a communication type associated with the received communication start request;
    step C of selecting, by the mobile communication network, a connection target radio base station to which the mobile station is connected at the time of performing the specific communication, the selection being made on the basis of the determined communication type and a location of the mobile station; and
    step D of starting, by the mobile station, the specific communication through the selected connection target radio base station, wherein, in the step C, when the specific communication is emergency communication, the mobile communication network selects, as a connection target radio base station to which the mobile station is connected at the time of performing the specific communication, a radio base station determined to be highly reliable on the basis of at least one of installation location information, radio quality state in an area under control of the radio base station, a quality state of a backhaul line and whether or not to be a radio base station for public communications.

6. A mobile communication method comprising:

step A of transmitting, by a mobile station, a communication start request which requests start of specific communication, to a mobile communication network;

step B of determining, by the mobile communication network, a communication type associated with the received communication start request;

step C of selecting, by the mobile communication network, a connection target radio base station to which the mobile station is connected at the time of performing the specific communication, the selection being made on the basis of the determined communication type and a location of the mobile station; and step D of starting, by the mobile station, the specific communication through the selected connection target radio base station, wherein when the mobile station currently performing emergency communication as the specific communication transmits a handover request to a specific radio base station and when the specific radio base station is not determined to be highly reliable, the mobile communication network does not receive the handover request.

7. A radio controller comprising:

a connection-target radio-base-station selection unit configured to select a connection target radio base station to which a mobile station is connected at the time of performing the specific communication, the selection being made on the basis of a communication type and a location of the mobile station, the communication type being associated with a communication start request which requests start of the specific communication and is transmitted by the mobile station; and a connection-parameter notification unit configured to notify the mobile station of a connection parameter for starting communication through the connection target radio base station selected by the connection-target radio-base-station selection unit, wherein the connection-target radio-base-station selection unit knows a location of the mobile station on the basis of at least one of a location-registered area of the mobile station, identification information of a cell in which the mobile station is currently performing communication and location information indicating a longitude, a latitude and an altitude at which the mobile station is located.

8. A radio controller comprising:

a connection-target radio-base-station selection unit configured to select a connection target radio base station to which a mobile station is connected at the time of performing the specific communication, the selection being made on the basis of a communication type and a location of the mobile station, the communication type being associated with a communication start request which requests start of the specific communication and is transmitted by the mobile station; and a connection-parameter notification unit configured to notify the mobile station of a connection parameter for starting communication through the connection target radio base station selected by the connection-target radio-base-station selection unit, wherein, when the specific communication is emergency communication, the connection-target radio-base-station selection unit selects, as a connection target radio base station to which the mobile station is connected at the time of performing the specific communication, a radio base station determined to be highly reliable on the basis of at least one of installation location information, radio quality state in an area under control of the radio base station, a quality state of a backhaul line and whether or not to be a radio base station for public communications.

9. A radio controller comprising:

a connection-target radio-base-station selection unit configured to select a connection target radio base station to which a mobile station is connected at the time of performing the specific communication, the selection being made on the basis of a communication type and a location of the mobile station, the communication type being associated with a communication start request which requests start of the specific communication and is transmitted by the mobile station; and a connection-parameter notification unit configured to notify the mobile station of a connection parameter for starting communication through the connection target radio base station selected by the connection-target radio-base-station selection unit, wherein the radio controller does not receive a handover request when the mobile station currently performing emergency communication as the specific communication transmits the handover request to a specific radio base station and when the specific radio base station is not determined to be highly reliable.

10. A network device comprising:

a communication-type determination unit configured to determine the communication type associated with a communication start request which requests start of the specific communication and is transmitted by a mobile station;

a connection-target radio-base-station selection unit configured to select a connection target radio base station to which the mobile station is connected at the time of performing the specific communication, the selection being made on the basis of a location of the mobile station and the communication type associated with the communication start request;

a connection-parameter notification unit configured to notify the mobile station of a connection parameter for starting communication through the connection target radio base station selected by the connection-target radio-base-station selection unit, wherein the connection-target radio-base-station selection unit acquires a location of the mobile station on the basis of at least one of a location-registered area of the mobile station, identification information of a cell in which the mobile station is currently performing communication and location information indicating a longitude, a latitude and an altitude at which the mobile station is located.

11. A network device comprising:

a communication-type determination unit configured to determine the communication type associated with a communication start request which requests start of the specific communication and is transmitted by a mobile station;

a connection-target radio-base-station selection unit configured to select a connection target radio base station to which the mobile station is connected at the time of performing the specific communication, the selection being made on the basis of a location of the mobile station and the communication type associated with the communication start request;

a connection-parameter notification unit configured to notify the mobile station of a connection parameter for starting communication through the connection target radio base station selected by the connection-target radio-base-station selection unit, wherein when the specific communication is emergency communication, the connection-target radio-base-station selection unit selects, as a connection target radio base station to which the mobile station is connected at the time of performing the specific communication, a radio base station determined to be highly reliable on the basis of at least one of installation location information, radio quality state in an area under control of the radio base station, a quality state of a backhaul line and whether or not to be a radio base station for public communications.

12. A network device comprising:

a communication-type determination unit configured to determine the communication type associated with a communication start request which requests start of the specific communication and is transmitted by a mobile station;

a connection-target radio-base-station selection unit configured to select a connection target radio base station to which the mobile station is connected at the time of performing the specific communication, the selection being made on the basis of a location of the mobile station and the communication type associated with the communication start request;

a connection-parameter notification unit configured to notify the mobile station of a connection parameter for starting communication through the connection target radio base station selected by the connection-target radio-base-station selection unit, wherein the network device does not receive a handover request when the mobile station currently performing emergency communication as the specific communication transmits the handover request to a specific radio base station and when the specific radio base station is not determined to be highly reliable.

13. A radio base station comprising:

a connection-target radio-base-station selection unit configured to select a connection target radio base station to which a mobile station is connected at the time of performing the specific communication, the selection being made on the basis of a communication type and a location of the mobile station, the communication type being associated with a communication start request which requests start of the specific communication and is transmitted by the mobile station; and a connection-parameter notification unit configured to notify the mobile station of a connection parameter for starting communication through the connection target radio base station selected by the connection-target radio-base-station selection unit, wherein the connection-target radio-base-station selection unit acquires a location of the mobile station by the mobile communication network on the basis of at least one of a location-registered area of the mobile station, identification information of a cell in which the mobile station is currently performing communication and location information indicating a longitude, a latitude and an altitude at which the mobile station is located.

14. A radio base station comprising:

a connection-target radio-base-station selection unit configured to select a connection target radio base station to which a mobile station is connected at the time of performing the specific communication, the selection being made on the basis of a communication type and a location of the mobile station, the communication type being associated with a communication start request which requests start of the specific communication and is transmitted by the mobile station; and a connection-parameter notification unit configured to notify the mobile station of a connection parameter for starting communication through the connection target radio base station selected by the connection-target radio-base-station selection unit, wherein when the specific communication is emergency communication, the connection-target radio-base-station selection unit selects, as a connection target radio base station to which the mobile station is connected at the time of performing the specific communication, a radio base station determined to be highly reliable on the basis of at least one of installation location information, radio quality state in an area under control of the radio base station, a quality state of a backhaul line and whether or not to be a radio base station for public communications.

\* \* \* \* \*